United States Patent [19]
Federmann et al.

[11] Patent Number: 4,840,452
[45] Date of Patent: Jun. 20, 1989

[54] LIGHT WAVE CONDUCTOR-SENSOR FOR TENSION

[75] Inventors: Helmut Federmann, Bergisch Gladbach; Friedrich K. Levacher, Brauweiler; Georg Noack, Bergisch, all of Fed. Rep. of Germany

[73] Assignee: Felten & Guilleaume Energietechnik GmbH, Cologne, Fed. Rep. of Germany

[21] Appl. No.: 798,014

[22] Filed: Nov. 14, 1985

[30] Foreign Application Priority Data

Nov. 14, 1984 [DE] Fed. Rep. of Germany ....... 8433322
Jul. 27, 1985 [DE] Fed. Rep. of Germany ....... 3526966

[51] Int. Cl.⁴ .............................. G02B 6/44; H01J 5/16
[52] U.S. Cl. .................................... 350/96.23; 156/51; 156/172; 264/1.5; 264/103; 264/136; 264/174; 350/96.15; 350/96.2; 350/96.29
[58] Field of Search ................ 264/1.5, 103, 136, 174; 156/51, 52, 53, 56, 172; 350/96.15, 96.20, 96.21, 96.22, 96.23, 96.29, 96.34, 96.3

[56] References Cited

U.S. PATENT DOCUMENTS

| | | | |
|---|---|---|---|
| 3,871,935 | 3/1975 | Gloge et al. | 264/1.5 X |
| 4,081,208 | 3/1978 | Meade | 350/96.20 |
| 4,082,423 | 4/1978 | Glista et al. | 350/96.23 |
| 4,226,504 | 10/1980 | Bellino | 350/96.23 |
| 4,231,635 | 11/1980 | Zeidler et al. | 350/96.23 |
| 4,457,583 | 7/1984 | Mayr et al. | 264/1.5 X |
| 4,474,426 | 10/1984 | Yataki | 264/1.5 X |
| 4,606,604 | 8/1986 | Soodak | 350/96.23 |
| 4,634,217 | 1/1987 | Levacher et al. | 350/96.23 |

FOREIGN PATENT DOCUMENTS

| | | |
|---|---|---|
| 2606777 | 9/1977 | Fed. Rep. of Germany ... 350/96.23 |
| 3305234 | 8/1984 | Fed. Rep. of Germany . |
| 61-11712 | 1/1986 | Japan ..................... 264/1.5 |

Primary Examiner—Jeffery Thurlow
Assistant Examiner—Leo B. Tentoni
Attorney, Agent, or Firm—Michael J. Striker

[57] ABSTRACT

A light wave conductor-sensor for tension, comprises a primary coated light wave conducting element, at least one coil wound on the primary light wave conducting element and forming together with the latter a sensor core, and a compound including longitudinally extending tension-proof fibers embedded in a synthetic plastic matrix, the compound forming a casing for the sensor core.

23 Claims, 2 Drawing Sheets

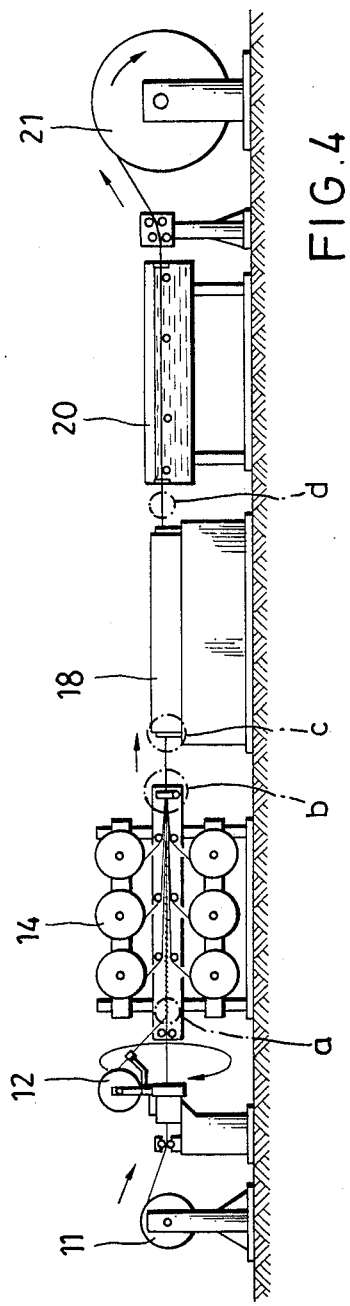
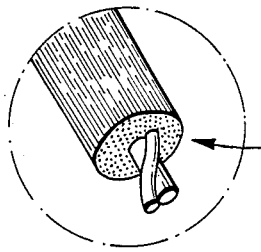
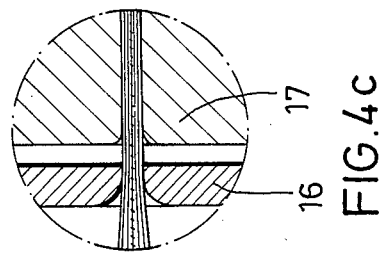
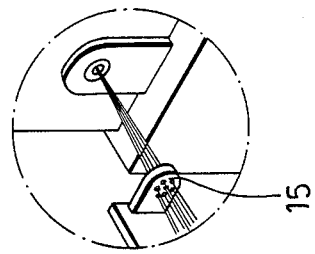
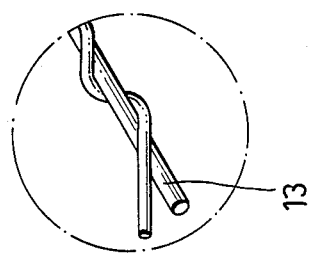

LIGHT WAVE CONDUCTOR-SENSOR FOR TENSION

BACKGROUND OF THE INVENTION

The present invention relates to a light wave conductor-sensor for tension. More particularly it relates to such a light wave conductor-sensor which has a primary coated light wave conductor, a tension-proof casing of a fiber-reinforced synthetic plastic material, and an inhomogenous synthetic plastic layer arranged between them. It is embedded into structural parts to be monitored and allows an article monitoring of the structural parts as to their mechanical stresses, such as tension, breakage and bending. The invention also relates to a method of manufacturing of such a light wave conductor-sensor.

It is known to embed a light wave conductor in a tension-proof wire of a fiber-reinforced resin structure and to monitor the wire by means of the light wave conductor as to tension, breakage or bending, as disclosed for example in the DE-OS 3,350,234. For this purpose the light wave conductor is enclosed by a synthetic plastic layer which has an inhomogenous structure. The light wave conductor, the intermediate layer and the wire are fixedly connected with one another mechanically over their entire length. The light wave conductor is provided at its both ends with connections for a light continuous-check device. The intermediate layer between the light wave conductor and the tension-proof casing is composed of synthetic plastic or synthetic resin with fine-grain powder of glass, quartz, corundum or abrasive added thereto. In accordance with a further embodiment, the intermediate layer can also be composed of resin-impregnated glass fibers which are wound around the light wave conductor. Such a tension-proof wire with an embedded light wave conductor must be used in a respective thickness with an outer diameter of over 5 mm as monitorable reinforced concrete wire. Its design can still be improved in the sense of the sensor sensitivity.

In this tension-proof wire the casing of the light wave conductor core is composed of a fiber-reinforced resin structure, for example of glass fibers in a matrix of polyester resin. It is also known in fiber-composite materials to embed the reinforcing fibers (instead of a matrix of synthetic resin in the sense of hardenable duroplastic synthetic plastics), in a matrix of thermoplastic synthetic plastic materials, preferable examples are: for glass fibers to use polyamide as a matrix, and for fibers of carbon or aramides to use high density polyethylene, polypropylene or polyvinylidenefluoride.

It is also known to manufacture shaped members of glass-reinforced synthetic plastic material by means of horizontally operating drawing processes. In accordance with this technique a number of glass fiber strands (rovings) is drawn from a coil frame, impregnated with resin, and guided through at least one drawing nozzle. The compression takes place in the nozzle, and moreover resin excess and air are removed. After this, the fiber-reinforced shape member is hardened in several furnaces, cooled again in a bath, and after discharging from the drawing arrangement is subdivided into individual pieces.

SUMMARY OF THE INVENTION

Accordingly, it is an object of the present invention to provide a light wave conductor-sensor for tension and a method of manufacturing the same, in accordance with which the light wave conductor-sensor obtains an increased sensor sensitivity, on the one hand, and can be used in different structural elements, on the other hand.

In keeping with these objects and with others which will become apparent hereinafter, one feature of the present invention resides, briefly stated, in a light wave conductor-sensor in which a coil of a metal wire or a glass fiber is wound around a primary coated light wave conductor, and this sensor core is encased by a composition composed of longitudinally extending tension-proof fibers embedded in a synthetic resin matrix.

The design and operation of the coil wound around the primary coated light wave conductor is decisive for the sensor sensitivity. For this purpose, in accordance with a further embodiment of the invention, it is advantageous when the diameter of the coil wire or coil fiber is smaller than the diameter of the primary coated light wave conductor. The diameter of the coil wire or fiber lies between 0.06 and 0.12 mm, while the diameter of the primary coated light wave conductor lies between 0.15 and 0.30 mm so as to provide the diameter ratio of preferably 0.5. It is further advantageous when the length of lay (length of twist) of the coil is greater than 2.2 times the diameter of the primary coated light wave conductor. Also, several coils can be wound around the primary coated light wave conductor in a parallel lay or a crossing lay.

The casing of the sensor core with tension-proof fibers and synthetic plastic matrix is wire-shaped and its outer diameter lies advantageously between 1.5 and 2.5 mm. For better embedding into a structural part to be monitored, it is advantageous when the outer surface of the casing is uneven, for example, by providing on it a stamped structure or a wound coil. The wire-shaped casing can have a further plate-shaped casing in which the sensor is embedded in the stress direction of the plate.

In accordance with a further advantageous embodiment of the invention, the light wave conductor-sensor includes a coil wire of steel having a thickness of substantially 0.08 mm, and the tension-proof fibers of the casing are composed of glass.

When the light wave conductor-sensor is designed in accordance with the present invention it provides for various advantages, particularly the advantage of good adaptability of the light wave conductor-sensor to its surroundings, when the fibers of the casing are embedded (instead of a matrix of synthetic plastic in the sense of duroplastic synthetic plastic materials, such as polyester resins) into a matrix of thermoplastic synthetic plastic materials such as polyamide or polyurethane of high density.

In accordance with the method of manufacturing of the present invention, the winding of coil or coils of a metal wire of glass fiber on a primary coated light wave conductor and the encasing of the sensor core with tension-proof fibers coated with a synthetic plastic material is performed in one working step in a horizontal drawing process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2a is a perspective view of the light wave conductorsensor of a somewhat different embodiment;

FIG. 4 is a view schematically showing a horizontal drawing arrangement for manufacturing a light wave conductorsensor in accordance with the present invention;

FIGS. 4A–4D are enlarged views of four various positions of the drawing arrangement; and FIGS. 5 and 6 show two further embodiments of the light wave conductor-sensor.

DESCRIPTION OF THE PREFERRED EMBODIMENTS

Figure 1:
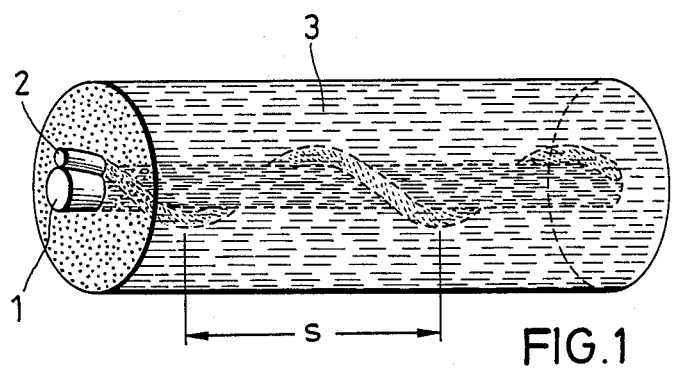
FIG. 1 is a perspective view of a light wave conductor-sensor in accordance with the present invention, with a wire-shaped casing of fiber composite material and with an inhomogenous intermediate layer of a metal wire wound around the light wave conductor.

A light wave conductor-sensor shown in FIG. 1 has a primary coated light wave conducting element, known as an optical fibre, identified with reference numeral 1. A coil 2 is wound on the primary coated light wave conducting element 1. A wire-shaped casing 3 or fiber compound material, for example fiber-reinforced synthetic plastic material high-density polyethylene, etc. is further provided. During applying the casing 3, the excessive synthetic plastic material fills the intermediate space between the coil 2 and the longitudinally extending glass fibers embedded in the synthetic plastic material. The length of twist of the coil 2 which is wound on the primary coated light wave conductor satisfies the following requirement: it is selected so that during an axial expansion of the tension-proof casing 3 the diameter of the coil 2 reduces stronger than the diameter of the expanded light wave conducting element 1 together with its primary coating. Therefore the coil axially presses against the light wave conductor and produces in it micro curves which cause a transmission increase and are determinable by means of transmission measuring device.

Figure 2:
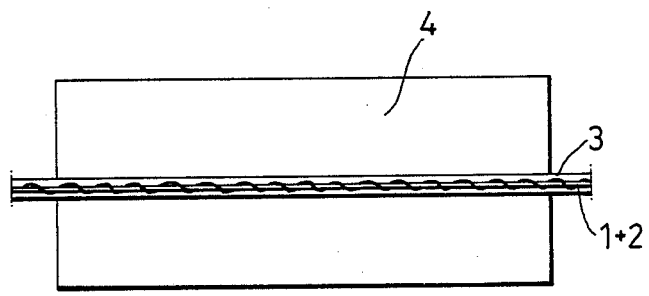
FIG. 2 is a longitudinal section of a light wave conductor-sensor with a further plate-shaped casing; In a side view

In the light wave conductor-sensor shown in FIG. 2 the light wave conducting element with the coil 2, for example of steel wire, and the casing 3 having a wire-like shape are provided with a further plate-shaped casing 4 composed of glass fiber reinforced synthetic plastic material. The light wave conductor-sensor 1-3 as a whole is embedded in the stress direction (here the longitudinal direction) of the plate 4. The light wave conductor core composed of the primary coated light wave conducting element 1 and the coil 2 wound thereon can be directly embedded in the plate 4 of the glass fiber reinforced synthetic plastic material.

As shown in FIG. 2a, only the light wave conducting element 1 with the coil 2 having a wall-like shape can be embedded in the plate-shaped casing 4.

Figure 3:
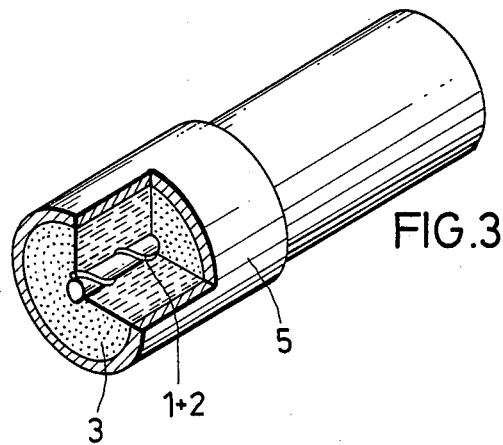
FIG. 3 is a perspective view showing a sensor end formed as a plug.

For connecting the light wave conductor-sensor, a plug can be used which has been tested in monomode light wave conductors and shown in FIG. 3. For this purpose a metal sleeve 5 is arranged at each end of the sensor on the protective casing and attached thereto for example, by glueing. Its outer diameter, after centering of the encased light wave conductor 1 in the rotary axle of a turning lathe, is turned from an excess of the quantity required for light wave conductor-plug connections in accordance with standards. The German Industrial Standard 47255 Part I, of April 1984 can be used for this purpose.

A method of manufacturing the inventive light wave conductor-sensor is schematically illustrated in FIG. 4. It shows individual steps of the manufacturing process for a light wave conductor-sensor or accurate sensor strand in which the fibers of the casing are embedded in a matrix of a thermoplastic synthetic plastic material.

The primary coated light wave conducting element 1 is drawn from a supply drum 11, moved in direction of a horizontal axis of a pulling arrangement 11–21, and wound around by a metal wire or glass fiber 2 in a helical manner. The thus formed sensor core which includes the primary coated light wave conducting element 1 and the coil 2 is drawn centrally and with reproducibly adjusted tension through a fiber discharge device 14 to a fiber guide 15. Thereby the fiber strands (rovings) impregnated with thermoplastic synthetic plastic material are applied onto the sensor core. The encased sensor core moves further into a profiling nozzle 16 with a heating device 17 in which the impregnation is melted, the strand elements are connected with one another, and the strand is calibrated. Then the strand 19 is cooled with water in a trough 20 and wound on a drum 21.

If the strand is to be provided with an uneven outer surface immediately after calibration a structure is impressed (stamped) on the surface of the strand, or at least one wire or fiber is helically wound on the strand.

As can be seen from FIGS. 5 and 6, the light wave conductor-sensor can be provided with at least on further coil which is wound on the primary coated light wave conducting element 1. The further coil 2' shown in FIG. 5 extends parallel to the coil 2. The further coil 2' shown in FIG. 6 is arranged so that it crosses the coil 2.

FIGS. 5 and 6 also show that the casing 3 can have an uneven outer surface for improving its embedding into a structural part to be monitored. The outer surface of the casing 3 in FIG. 5 has an impressed structure with impressions 3' which provide the desired unevenness. The outer surface of the casing 3 in FIG. 6 is provided with an additional coil 3" which is wound around the outer surface so as to make it uneven.

It will be understood that each of the elements described above, or two or more together, may also find a useful application in other types of constructions differing from the types described above.

While the invention has been illustrated and described as embodied in a light wave conductor-sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A light wave conductor-sensor for tension, comprising a primary coated light wave conducting element; at least one coil wound on said primary coated light wave conducting element and forming together with the latter a sensor core; and a compound including longitudinally extending tension-proof fibers embedded in a synthetic plastic matrix, said compound forming a casing for said sensor core, said primary coated light wave conducting element having a predetermined diameter, said coil having a length of twist which is greater than 2.2 times the diameter of said primary coated light wave conducting element.

2. A light wave conductor-sensor as defined in claim 1, wherein said coil of said sensor core is composed of a metal wire.

3. A light wave conductor-sensor as defined in claim 1, wherein said coil of said sensor core is composed of a glass fiber.

4. A light wave conductor-sensor as defined in claim 1, wherein, said coil is formed of a member with a diameter which is smaller than the diameter of said primary coated light wave conducting element.

5. A light wave conductor-sensor as defined in claim 4, wherein the diameter of said member of said coil is substantially between 0.06 and 0.12 mm, the diameter of said primary coated light weight conducting element being substantially between 0.15 and 0.30 mm.

6. A light wave conductor-sensor as defined in claim 5, wherein the ratio of the diameters of said member of said coil and said primary coated light wave conducting element is substantially equal to 0.5.

7. A light wave conductor-sensor as defined in claim 1; and further comprising at least one further such coil which is wound on said primary coated light wave conducting element.

8. A light wave conductor-sensor as defined in claim 7, wherein said coils extend parallel to one another.

9. A light wave conductor-sensor as defined in claim 7, wherein said coils are arranged in crossing manner relative to one another.

10. A light wave conductor-sensor as defined in claim 1, wherein said casing composed of tension-proof fibers and synthetic plastic matrix is wire shaped and has an outer diameter of substantially between 1.5 and 2.5 millimeter.

11. A light wave conductor-sensor as defined in claim 1, wherein said casing has an outer surface which is uneven for improving embedding into a structural part to be monitored.

12. A light wave conductor-sensor as defined in claim 11, wherein the outer surface of said casing has an impressed structure to make it uneven.

13. A light wave conductor-sensor as defined in claim 11, and further comprising an additional coil which is wound on the outer surface of said casing so as to make it uneven.

14. A light wave conductor-sensor as defined in claim 1, wherein said casing is formed as a plate having a loading direction, said core being wire-shaped and embedded in said plate so as to extend in the loading direction.

15. A light wave conductor-sensor as defined in claim 1; and further comprising a further casing which is formed as a plate having a loading direction, said core together with said first-mentioned casing being wire shaped and embedded in said plate so as to extend in the loading direction.

16. A light wave conductor-sensor as defined in claim 1, wherein said casing has two ends; and further comprising a metal sleeve arranged on each end of said casing and connected therewith.

17. A light wave conductor-sensor as defined in claim 16, wherein each of said metal sleeves is glued to a respective one of said ends of said casing.

18. A light wave conductor-sensor as defined in claim 16, wherein each of said metal sleeves has an outer diameter which is turned off so as to to the dimension required for a light wave conductor-plug connection in accordance with German Industrial Standard 47255 Part I, of April 1984.

19. A light wave conductor-sensor as defined in claim 1, wherein said coil is formed of a steel wire, said tension-proof fibers of said casing being composed of glass.

20. A light wave conductor-sensor as defined in claim 1, wherein said matrix of said casing is composed of synthetic plastic resin having duroplastic properties.

21. A light wave conductor-sensor as defined in claim 1, wherein said matrix of said casing is composed of a thermoplastic synthetic plastic material.

22. A light wave conductor-sensor as defined in claim 21, wherein said matrix of said casing is composed of polyamide.

23. A light wave conductor-sensor as defined in claim 21, wherein said matrix of said casing is composed of high density polyethylene.

* * * * *